(12) United States Patent
Lee

(10) Patent No.: US 10,386,215 B2
(45) Date of Patent: Aug. 20, 2019

(54) METHOD FOR MONITORING A FLOW USING DISTRIBUTED ACOUSTIC SENSING

(71) Applicant: Erik N. Lee, Houston, TX (US)

(72) Inventor: Erik N. Lee, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 830 days.

(21) Appl. No.: 14/328,137

(22) Filed: Jul. 10, 2014

(65) Prior Publication Data
US 2015/0075292 A1 Mar. 19, 2015

Related U.S. Application Data

(60) Provisional application No. 61/869,346, filed on Aug. 23, 2013.

(51) Int. Cl.
G01F 1/66 (2006.01)
E21B 47/10 (2012.01)

(52) U.S. Cl.
CPC .............. G01F 1/66 (2013.01); E21B 47/101 (2013.01)

(58) Field of Classification Search
CPC ...................................................... E21B 28/00
USPC ........... 702/8, 12, 49, 83, 100; 166/249, 386
See application file for complete search history.

(56) References Cited

U.S. PATENT DOCUMENTS 2,626,979 A * 1/1953 Woods ..................... G01V 3/24
192/84.1
3,056,917 A * 10/1962 Tanguy .................... G01V 3/18
324/339
3,865,201 A 2/1975 Haden
9,766,119 B2 * 9/2017 Den Boer ................ G01V 1/40
2001/0023614 A1 9/2001 Tubel et al.
2004/0035591 A1 * 2/2004 Echols ..................... E21B 43/08
166/386
2010/0200744 A1 * 8/2010 Pearce ..................... G01V 8/16
250/268

(Continued)

FOREIGN PATENT DOCUMENTS

WO 2012072981 A2 6/2012
WO 2012150463 A1 11/2012

OTHER PUBLICATIONS

International Search Report and Written Opinion, International Application No. PCT/US2014/047792, dated Nov. 13, 2014, Korean Intellectual Property Office, International Search Report 7 pages, Writtion Opinion 4 pages.

Primary Examiner — Tung S Lau
(74) Attorney, Agent, or Firm — Cantor Colburn LLP

(57) ABSTRACT

A method of monitoring acoustic energy using distributed acoustic sensing. The method involves supplying a fluid flow at different pressures and sensing fluid flow characteristics in at least one location at each pressure. The data may be processed to provide a fluid resistance value related to a particular fluid flow at each location, collectively forming a fluid resistance index (FRI). The method may include following the initial fluid flow with a process flow, which may then be followed by another fluid flow. The flow characteristics of the latter fluid flow may be measured and compared with the initial fluid flow, providing a measure of the success of the process flow. In application, this method may be used to enhance downhole operations, including acid stimulation treatments.

11 Claims, 2 Drawing Sheets

(56) References Cited

U.S. PATENT DOCUMENTS

| | | | |
|---|---|---|---|
| 2011/0139440 A1* | 6/2011 | Zolezzi-Garreton | ... E21B 28/00 166/249 |
| 2012/0018149 A1* | 1/2012 | Fidan | ........................ G01V 8/16 166/250.03 |
| 2012/0111104 A1 | 5/2012 | Taverner et al. | |
| 2014/0064028 A1* | 3/2014 | Coates | .................... E21B 47/01 367/35 |

* cited by examiner

METHOD FOR MONITORING A FLOW USING DISTRIBUTED ACOUSTIC SENSING

CROSS REFERENCE TO RELATED APPLICATIONS

This application claims the benefit of an earlier filing date from U.S. Provisional Application Ser. No. 61/869,346 filed Aug. 23, 2013, the entire disclosure of which is incorporated herein by reference.

BACKGROUND

The present disclosure relates generally to a method for monitoring characteristics of flow through a region using distributed acoustic sensing. More particularly, the disclosure relates to monitoring and processing acoustic data describing flow resistance relative to a flow in a subterranean region.

The rate of production of hydrocarbons such as oil and gas is often controlled by the rate at which such hydrocarbons can be extracted from the subterranean formations containing them. Regardless of how much oil and gas is present in a formation, it has no value if it cannot be produced at a commercially practical rate. One means for improving the rate at which oil and gas may be removed from a subterranean formation is the use of acid stimulation treatments. The implementation of these treatments, however, requires a substantial amount of speculation as to the amount and concentration of an acid solution, the use and timing of various diverter agents, and so forth. The art is always receptive to methods and apparatus to improve efficiency in production.

SUMMARY

Disclosed herein is a distributed acoustic sensing method performed by delivering a fluid flow into the region of interest through the tubular. The fluid flow is supplied at multiple distinct pressures for corresponding time intervals. A fiber optic cable is used to sense acoustic data related to the fluid flow at each discrete pressure. This data is then processed to provide an indication of the flow characteristics of the region.

Further disclosed herein is a method for analyzing flow characteristics in a subterranean region. A first fluid flow is delivered to the subterranean region via a tubular using at least two distinct pressures over time. Acoustic data related to the first fluid flow is sensed and processed to measure the acoustic energy of the first fluid flow in the at least one zone of the subterranean region.

Further disclosed herein is a method for stimulating subterranean flow characteristics. The process is performed by delivering an initial non-stimulating fluid flow through a production tubing at multiple distinct pressures over time. Acoustic data related to the initial non-stimulating fluid flow is sensed and processed to determine a flow resistance index. Finally, a process flow including a stimulant is delivered to the region.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to downhole acid stimulation treatments, whereas the advantages of the present disclosure as applied in a related field would be apparent to one having ordinary skill in the art and are considered to be within the scope of the present invention.

Downhole operations, including acid stimulation, are typically conducted on a basis of general scientific knowledge, but with very little specific knowledge about the characteristics of a particular subterranean region. As disclosed herein, a method for monitoring acoustic energy that increases the information based upon which downhole operations can be conducted. In particular, various aspects of the present invention provide techniques that can assess the flow resistance related to a particular flow in a subterranean region and the various zones therein individually, and provide a useful assessment of the success of a particular stimulation operation.

Figure 1:
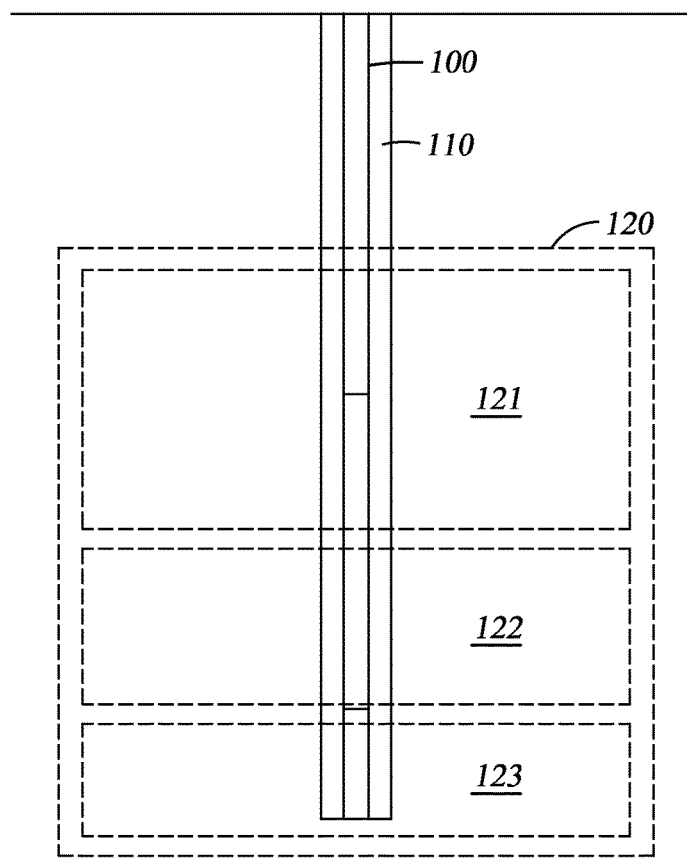
FIG. 1 depicts a distributed acoustic sensing system, as employed in one embodiment.

Referring to FIG. 1, a method for monitoring acoustic energy is disclosed, wherein a fiber optic cable 100 or fiber optic based distributed acoustic sensing system is employed to measure the acoustic energy in a region of interest 120. The fiber optic cable 100 is first deployed with a tubular 110 in a region of interest 120. A fluid flow is then introduced into the region of interest 120 via the tubular 110, wherein the fluid flow is supplied at multiple pressures while the fiber optic cable 100, containing acoustic sensing components, is used to gather acoustic data regarding the flow in the region of interest, which may comprise several zones (121, 122, 123). The acoustic data is then processed, which may, for example, provide a profile of the flow resistance related to the fluid flow in the various zones of the region of interest 120. This data may be used to reflect the flow resistance characteristics related to the flow in several discrete zones (121, 122, 123) within the region of interest 120.

In application, the fiber optic cable may be a sensing cable and characteristic of other distributed acoustic sensing systems known in the art. The fiber optic cable may be sufficiently coupled to the tubular that it may detect flow-induced dynamic energy, such as acoustic vibrations. The tubular may be, for example, production tubing as part of an oil well. Accordingly, various embodiments of the present disclosure are applicable where the region of interest is a subterranean region. Other examples of flow analysis in which the present disclosure might be useful, include flow through man-made structures, microscopic applications, or the like.

The fluid flow described above may comprise water or some other fluid, such as a non-reacting fluid. In acid stimulation treatments, this fluid flow may be injected into the region of interest just prior to the acid stimulation. This is sometimes referred to as pre-stimulation injection. In most cases, the fluid supplied at each distinct pressure comprises the same components. As used herein, the term "fluid" or "fluids" includes liquids, gases, hydrocarbons, multi-phase fluids, mixtures of two of more fluids, water and fluids injected from the surface, such as water. Additionally, references to water should be construed to also include water-based fluids; e.g., brine or salt water.

Figure 2:
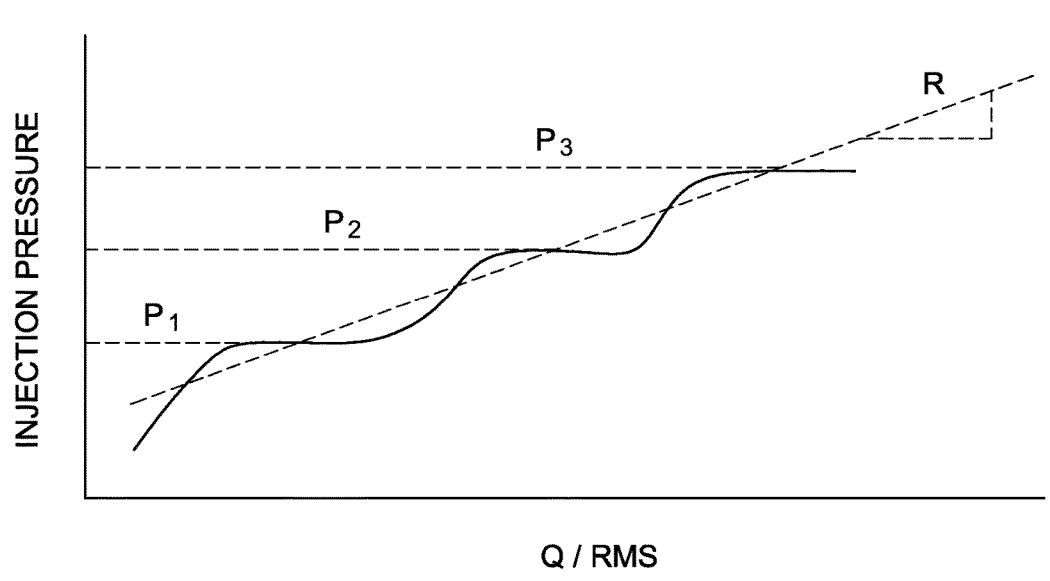
FIG. 2 depicts a graph of a flow resistance value at different injection pressures and at a single spatial location, in accordance with another embodiment.

The acoustic data, when processed as a comparative analysis of flow resistance in the various zones, may be used to calculate a representative value such as a Flow Resistance Index (FRI). A simplified Darcy, flow-based interpretation would suggest a linear relationship between flow rate and changes in fluid pressure, where the pressure change is scaled by a resistance term $\{Q=R(P1-P2)\}$. This generic method can be used to extract a resistance value for a particular zone or region. Referring to FIG. 2, one embodiment includes supplying the fluid flow at three or more distinct pressures (P1, P2, P3) to determine the flow resistance characteristics related to a particular fluid flow in one zone of a particular region. The data gathered using fiber optic cable 100 from one zone may be, for example, plotted on a graph wherein various curve-fitting techniques can be used to determine if the relationship between pressure and flow resistance is linear in that zone. This data may be presented as a Flow Resistance Index (FRI) that can be used to describe the flow resistance relative to a fluid flow in a region, and to compare flow resistance values relative to similar fluid flows at particular zones and times.

Each fluid flow, such as a non-reacting fluid flow or pre-stimulation flow, should be supplied at a constant pressure for a period of time long enough to obtain a reliable data set for the entire region of interest, or at least for a particular zone therein. The time interval for each distinct pressure may be determined independently. The fluid flow is supplied at a particular pressure, which should correlate to a particular flowrate through particular zones. Use of two distinct pressures will provide two collective data points, which may be adequate in many circumstances, such as for example, where the assumption holds true that the relationship between pressure and flow resistance is effectively linear. The use of three or more pressures may provide further evidence of the relationship in any given case. However, due to the presence of a variety of other factors, there will likely be many instances where the relationship is decidedly non-linear. Thus, the number of distinct pressures used to gather data related to a particular flow may be chosen as required for a specific application, but will often be three or more.

In some embodiments, where the invention is used as part of an acid stimulation operation, the method will include measuring acoustic data at various times within the acid stimulation process, including the introduction of various acid solutions, diverter agent solutions, and post-stimulation flows. Other process flows used in accordance with the present disclosure also provide useful measurements.

The Flow Resistance Index (FRI) described herein can be computed for a given region, without regard to the potential for a stimulation treatment or other process flow. The flow characteristics that may be observed from an FRI measurement is useful independent of such operations. The measurement may be taken with varying degrees of accuracy, depending on the homogeneity of fluid chosen or available for the measurement.

In some embodiments, it may be useful to design the acid stimulation process, or other process flows, in accordance with the data retrieved during the initial fluid flow. For example, the data may indicate that a particular zone has very little flow resistance. In such a case, it may be useful to direct diverter agents to that particular zone as much as possible, in order to divert the acid solutions to zones where more flow stimulation is needed.

In another embodiment, a second non-stimulation fluid injection application is made after the conclusion of the process flows, such as a series of stimulation flows, diverter flows, and post-stimulation flows. The second non-stimulation fluid injection application is conducted in a manner similar to the initial non-stimulation fluid flow, including the use of distinct pressures for adequate time intervals to gather data that may be used to form a flow resistance index. In some embodiments, it is useful to perform the second non-stimulation fluid flow or injection in a manner identical to the first slickwater flow or injection.

Figure 3:
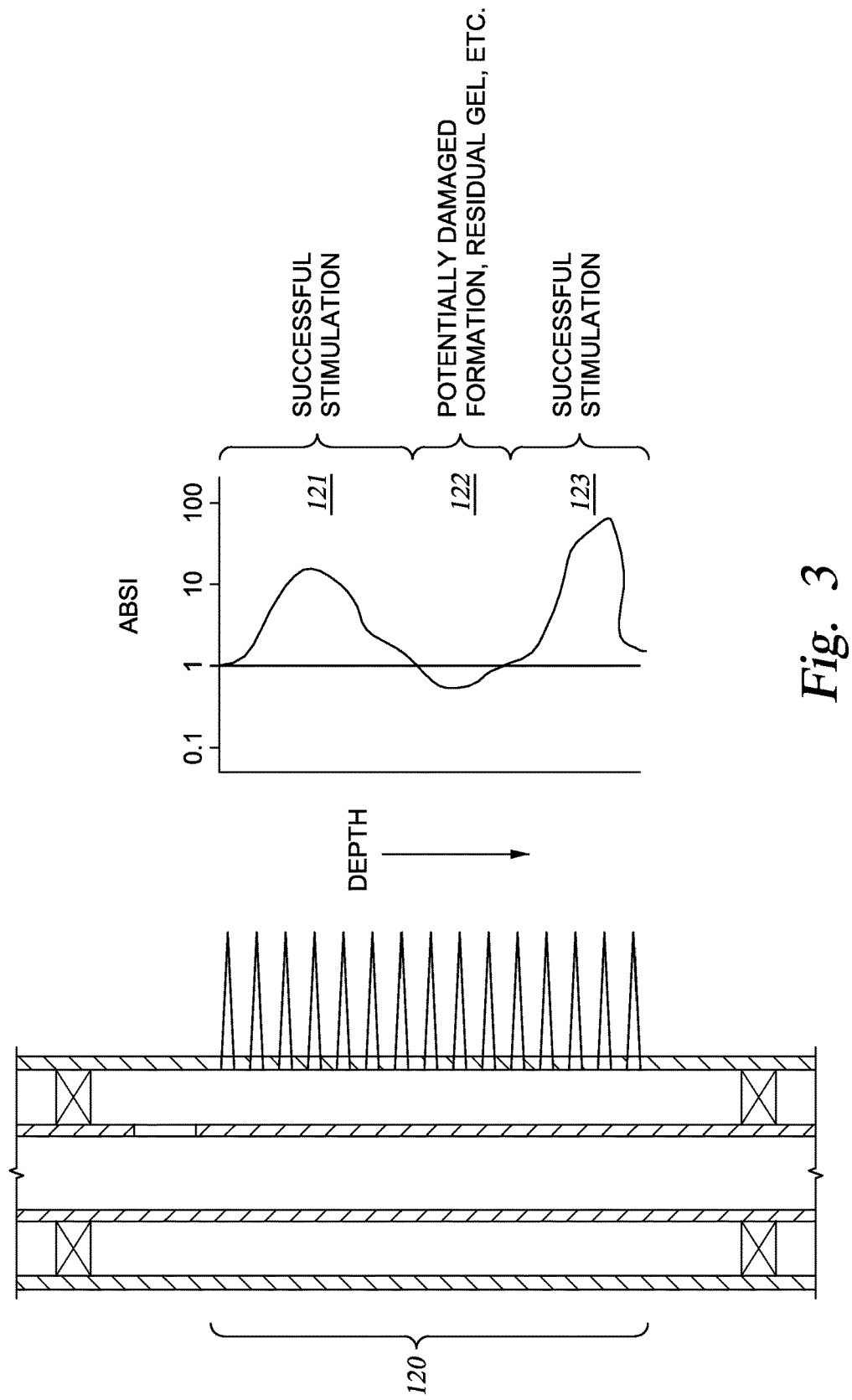
FIG. 3 depicts a system for distributed acoustic sensing and a correlating chart of flow resistance measurements, in accordance with another embodiment.

The respective flow resistance indices associated with the different flows can be labeled as FRI(pre) and FRI(post). A comparison of these two indices, at the data points for corresponding locations or zones, is useful in evaluating the success of the acid stimulation. For example, FIG. 3 depicts a system similar to that depicted in FIG. 1. The graph on the right side of FIG. 3 plots the ratio of FRI(post)/FRI(pre) along the depth of the region of interest 120. This ratio may be called Acoustic Based Stimulation Index (ABSI). The graph of FIG. 3 shows that, over the course of the subject stimulation treatment, the flow resistance in zones 121 and 123 were greatly improved, while the resistance in zone 122 actually increased. A decrease in the ABSI like the one shown in zone 122 may occur as a result of damage in the subterranean formation or a buildup of diverter agents, gels, etc.

One advantage of the Acoustic Based Stimulation Index (ABSI) described herein, is that sensor response effects, at least those inherent to the system and constant over time, are largely eliminated. Using different techniques to couple a fiber optic cable to a production tubing will yield varying sensor responses relative to the position of the coupling devices. Accordingly, the technique and relative skill with which the fiber optic cable is coupled to the production tubing introduces a sensor response effect that is not equal at all sensing locations, modifying the true dynamic energy at a given sensor. It can be difficult to account for such effects through calibration alone. However, because it is reasonable to assume that the sensor response is a time-invariant phenomenon, the sensor response effect may be eliminated by computing a ratio of two acoustic measurements at the same depth.

The method disclosed herein may be useful in a detecting a subterranean zone, for example, that was under-stimulated in comparison with other regions. This data could be used to quantify the results of a previous acid stimulation, and potentially to modify future stimulation activities in the same well or similar wells in an attempt to improve the stimulation and diverter procedure.

As an example, consider an oil well that is under consideration for re-stimulation. In this case, assume that an FRI(pre) and FRI(post) were during a previous stimulation operation. An assessment of the ABSI for the previous stimulation could be used to identify areas that tended to have more or less resistance. Modifications to a potential re-stimulation operation could be employed to more evenly distribute the acid within the zone and help improve the efficiency of the well. Where multiple injection valve locations are available a prior ABSI might influence which valve the stimulation is conducted through. Prior to the re-stimulation, a third FRI could be gathered, termed here as FRI (restim). This new FRI could be used to assess what sections of the zone had increased plugging since the previous stimulation. This might serve to indicate which areas might be responsive to further stimulation, dictate acid rates, volumes, concentrations as well as diverter schemes to be employed. In accordance with the disclosure above, the utility of the third or independent FRI may be useful as a comparison value, forming an ABSI by comparing earlier data, or may be used for its own value as an assessment of the status of the particular region. Such utility is not dependent on whether or not a stimulation treatment or other process is planned or is being considered.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for transforming a region of an earth formation by stimulation based on distributed acoustic sensing, comprising:
    delivering a first portion of a fluid flow into the region of the earth formation via a tubular, the first fluid flow being supplied at a first pressure over a first time interval;
    delivering a second portion of a fluid flow into the region via the tubular, the second fluid flow being supplied at a second pressure different from the first pressure over a second time interval;
    sensing acoustic energy with a fiber optic cable configured for distributed acoustic sensing of acoustic energy to provide distributed acoustic sensing data related to the each of the first fluid flow and the second fluid flow in the region;
    processing the distributed acoustic sensing data to determine a flow resistance value that characterizes the region; and
    transforming the region by stimulating the region by operating stimulation equipment based on the flow resistance value being less than a desired value.

2. The method of claim 1, wherein the flow resistance value quantifies a resistance to fluid flow in the region.

3. The method of claim 1, further comprising:
    delivering a third portion of a fluid flow into the region via the tubular, the third portion being supplied at a third pressure over a third time interval; and
    sensing acoustic data related to the third fluid flow in the region with the fiber optic cable configured for distributed acoustic sensing of acoustic energy.

4. The method of claim 1, wherein the region comprises at least one subterranean zone.

5. The method of claim 1, wherein the acoustic data related to each of the first fluid and second portions of the fluid flow is processed to form a flow resistance index indicative of the flow resistance related to the fluid flow in the region, the flow resistance index comprising a linear relationship between pressure and flow resistance.

6. A method for transforming a subterranean region of an earth formation based on analyzing flow characteristics in the subterranean region, comprising:
    delivering a first non-stimulating fluid flow to at least one zone of the subterranean region via a tubular, the first non-reacting fluid flow being supplied using at least two distinct pressures over time, the first non-stimulating fluid flow not reacting with the at least one zone to decrease flow resistance;
    sensing acoustic energy with a fiber optic cable coupled to the tubular to provide first acoustic data related to the first non-reacting fluid flow;
    processing the first acoustic data to determine flow characteristics of the first non-reacting fluid flow in the at least one zone of the subterranean region to include calculating at least one flow resistance value relative to the first non-reacting fluid flow in the at least one zone of the subterranean region;
    delivering at least one first process flow to the at least one zone of the subterranean region via the tubular;
    delivering a second non-stimulating fluid flow to the at least one zone of the subterranean region via the tubular, the second non-stimulating fluid flow not reacting with the at least one zone to decrease flow resistance;
    sensing acoustic energy with the fiber optic cable coupled to the tubular to provide second acoustic data related to the second non-reacting fluid flow;
    processing the second acoustic data related to the second non-reacting fluid flow to determine at least one flow resistance value relative to the second non-reacting fluid flow in the at least one zone of the subterranean region;
    comparing the flow resistance value relative to the first non-reacting fluid flow to the flow resistance value relative to of the second non-reacting fluid flow to provide comparison data; and
    transforming the subterranean region by delivering a second process flow based on the comparison data, wherein (i) the second process flow comprises a stimulation fluid based on the comparison data indicating a desired flow resistance decrease was not achieved by the first process flow or (ii) the second process flow comprises a diverter agent based on the comparison data indicating a desired flow resistance decrease was achieved by the first process flow.

7. The method of claim 6, wherein delivering the first non-stimulating fluid flow includes supplying the fluid flow using at least a third distinct pressure.

8. A method for transforming a subterranean region of an earth formation by stimulation based on an acoustic based stimulation index, comprising:
    delivering a first non-stimulating fluid flow to at least one zone of a subterranean region of an earth formation via a production tubing, wherein the first non-stimulating fluid flow is supplied at more than one distinct pressure over time, the first non-stimulating fluid flow not reacting with the at least one zone to decrease flow resistance;
    sensing acoustic energy with a fiber optic cable coupled to the production tubing to provide first acoustic data related to the first non-stimulating fluid flow;
    processing the first acoustic data related to the first non-stimulating fluid flow to determine a first flow resistance index related to the first non-stimulating fluid flow in the subterranean region, the first flow resistance index comprising a linear relationship between pressure and flow resistance;

delivering a process flow to the at least one zone of the subterranean region via the production tubing, wherein the process flow includes at least one stimulant flow;

delivering a second non-stimulating fluid flow to the at least one zone of the subterranean region via the production tubing, wherein the second non-stimulating fluid flow is supplied at more than one distinct pressure, the second non-stimulating fluid flow not reacting with the at least one zone to decrease flow resistance;

sensing acoustic energy with the fiber optic cable coupled to the production tubing to provide second acoustic data related to the second non-stimulating fluid flow;

processing the second acoustic data related to the second non-stimulating fluid flow to determine a second flow resistance index related to the second non-stimulating fluid flow in the subterranean region, the second flow resistance index comprising a linear relationship between pressure and flow resistance;

comparing the first flow resistance index related to the first non-stimulating fluid flow with the second flow resistance index related to the second non-stimulating fluid, thereby forming an acoustic based stimulation index comprising a ratio of the second flow resistance index to the first flow resistance index; and transforming the subterranean region by stimulating the subterranean region by operating stimulation equipment based on the acoustic based stimulation index to apply a stimulation treatment to the at least one zone of the subterranean region, wherein the acoustic based stimulation index does not indicate a desired improvement in the flow resistance due to the process flow.

9. The method of claim 8, wherein at least one of the first non-stimulating fluid flow and the second non-stimulating fluid flow is supplied at more than two distinct pressures over time.

10. The method of claim 8, further comprising using the flow resistance index related to the first non-stimulating fluid flow in planning and performing at least one aspect of the process flow.

11. The method of claim 8, wherein the process flow further comprises at least one diverter flow.

* * * * *